US008148515B1

(12) United States Patent
Mao et al.

(10) Patent No.: US 8,148,515 B1
(45) Date of Patent: Apr. 3, 2012

(54) DETECTION USING A DYE AND A DYE MODIFIER

(75) Inventors: Fei Mao, Fremont, CA (US); Wai-Yee Leung, San Ramon, CA (US); Hye Eun Hoover, Alameda, CA (US)

(73) Assignee: Biotium, Inc., Hayward, CA (US)

( * ) Notice: Subject to any disclaimer, the term of this patent is extended or adjusted under 35 U.S.C. 154(b) by 0 days.

(21) Appl. No.: 12/792,718

(22) Filed: Jun. 2, 2010

Related U.S. Application Data

(60) Provisional application No. 61/183,507, filed on Jun. 2, 2009.

(51) Int. Cl.
*C07H 21/00* (2006.01)
(52) U.S. Cl. ...... 536/25.32; 436/94; 536/24.3; 536/26.6
(58) Field of Classification Search ............ None
See application file for complete search history.

(56) References Cited

U.S. PATENT DOCUMENTS

| | | | | |
|---|---|---|---|---|
| 6,117,986 | A * | 9/2000 | Nardone et al. | 534/727 |
| 6,221,612 | B1 | 4/2001 | Knapp et al. | |
| 6,323,337 | B1 | 11/2001 | Singer et al. | |
| 7,205,100 | B2 | 4/2007 | Buttry et al. | |
| 2007/0020664 | A1 | 1/2007 | Gupta et al. | |
| 2008/0160518 | A1 | 7/2008 | Ward et al. | |
| 2009/0017466 | A1 | 1/2009 | Harma | |

OTHER PUBLICATIONS

Ihrig, J. et al. Application of DNA—specific dye EvaGreen for the routine quantification of DNA in microplates, 2006, Analytical Biochemistry, vol. 359,pp. 265-267.*
McGowan, K.B. et al., Biochemical quantification of DNA in human articular and septal cartilage using PicoGreen® and Hoechst 33258, 2002, Osteoarthritis and Cartilage, vol. 10(7), pp. 580-587.*
Jenkins, et al. Characterization of dipyridophenazine complexes of ruthenium(II): the light switch effect as a function of nucleic acid sequence and conformation. Biochemistry. Nov. 10, 1992;31(44):10809-10816.
Li, et al. Determination of nucleic acids based on shifting the association equilibrium between tetrasulfonated aluminium phthalocyanine and acridine orange. Analyst. Apr. 2001;126(4):518-22.
Nolan, et al. A simple quenching method for fluorescence background reduction and its application to the direct, quantitative detection of specific mRNA. Anal Chem. Nov. 15, 2003;75(22):6236-43.
Schmidt, et al. Fluorescence quencher improves SCANSYSTEM for rapid bacterial detection. Vox Sang. May 2006;90(4):276-8.

* cited by examiner

*Primary Examiner* — Yelena G Gakh
*Assistant Examiner* — Robert Xu
(74) *Attorney, Agent, or Firm* — Wilson Sonsini Goodrich & Rosati

(57) ABSTRACT

The present invention relates to dyes in general. The present invention provides a wide range of dyes and kits containing the same, which are applicable for labeling a variety of biomolecules such as nucleic acids, cells and microorganisms. The present invention also provides various methods of using the dyes for research and development, forensic identification, environmental studies, diagnosis, prognosis, and/or treatment of disease conditions.

14 Claims, 9 Drawing Sheets

(Eq. 1) $\quad D + T \leftrightarrow D\text{-}T$ (Eq. 2) $\quad D + M \leftrightarrow D\text{-}M$ (Eq. 3) $\quad D + T \leftrightarrow D\text{-}T$ (Eq. 4) $\quad D + M \leftrightarrow D\text{-}M$ (Eq. 5) $\quad D + T \leftrightarrow D^*\text{-}T$ (Eq. 6) $\quad D^* + M \leftrightarrow D\text{-}M$ (Eq. 7) $\quad D^* + T \leftrightarrow D^*\text{-}T$

DETECTION USING A DYE AND A DYE MODIFIER

This application claims benefit under 35 U.S.C. §119(e) to U.S. Provisional Application No. 61/183,507, filed Jun. 2, 2009, which is herein incorporated by reference in its entirety.

SEQUENCE LISTING

The instant application contains a Sequence Listing which has been submitted via EFS-Web and is hereby incorporated by reference in its entirety.

BACKGROUND OF THE INVENTION

Fluorescent dyes or stains can be used in the detection of nucleic acids, such as DNA and RNA, present in biological samples. Nucleic acid is the genetic information transmitted from one generation to the next and the routine functioning of a living organism. Nucleic acids are thus of great interest for research and development of diagnostics, therapeutics, forensic tools, and many other applications. Fluorescent dyes that specifically bind to nucleic acids and form highly fluorescent complexes are useful tools for studying nucleic acids. These dyes can be used to detect and quantify DNA and RNA in a variety of environments, including solutions, cell extracts, electrophoretic gels, micro-array chips, live or fixed cells, dead cells, and environmental samples. DNA binding dyes have also been used in quantitative real-time polymerase chain reaction or qPCR, a highly sensitive and specific gene detection technique widely used in both research and diagnostics.

Although numerous fluorescent nucleic acid-binding dyes are commercially available, limitations still exist in various applications. Traditional nucleic acid dyes include the Hoechst dyes, ethidium bromide, DAPI and Thiazole Orange. In general, these dyes have limited sensitivity and high background fluorescence. More recently, higher sensitive nucleic acid dyes have been developed by following two strategies. One strategy is to add positively charged side chains to a dye so that the binding affinity of the dyes is enhanced due to increased electrostatic interaction between the dyes and nucleic acids. Nucleic acid dyes designed using this principle include SYBR Green I, PicoGreen, TO-PRO dyes, YO-PRO dyes and dyes disclosed in U.S. Pat. Nos. 5,436,134; 5,658,751; 4,883,867; 5,582,977; 5,321,130; 5,410,030; and 5,863,753. Another strategy is to link two or three nucleic acid dyes with a linker to form a dimeric or trimeric dye (see, e.g., U.S. Patent Publication Nos. 2006/0211028 and 2008/0145526). In some cases, the linker may incorporate one or more positive charges to provide additional nucleic acid binding affinity (see, e.g., 5,410,030). Although most of these dyes are only weakly fluorescent in the absence of nucleic acids, the background fluorescence can be significant relative to the fluorescence gain when the amount of target nucleic acid is very small. Consequently, the intrinsic fluorescence of the dye often limits the detection sensitivity of the dye. In real-time PCR, a frequently encountered problem is that the dye inhibits the PCR reaction to some extent. While enough dye must be added to a PCR reaction in order to produce high PCR signal, too much dye can interfere with the PCR process. In some cases, the interference may be severe enough to completely stall the reaction, or generate nonspecific PCR products.

SUMMARY OF THE INVENTION

The present invention provides for methods and compositions for sensitive DNA quantitation by suppressing the background or intrinsic fluorescence of a nucleic acid binding dye. The present invention also provides for methods and compositions for modulating the nucleic acid binding affinity of the dye for useful applications, such as qPCR, melt curve analysis, and gel analysis.

In one embodiment, the reagent composition comprises (a) a light-emitting dye capable of binding to a nucleic acid, wherein the dye is not covalently bonded to a polynucleotide or a polypeptide; and (b) a light-emitting dye modifier that interacts with said dye, wherein said reagent composition produces a detectable signal that is linearly proportional to the amount of nucleic acids present in a sample over a range that is at least about 0.1, 0.2, 0.3, 0.4, 0.5, 0.6, 0.7, 0.8, 0.9, 1.0, 1.2, 1.4, 1.5, 2.0, 2.5 or 2.7 log greater than that would be linearly detectable by a composition substantially lacking said light-emitting dye modifier. In some instances, the reagent composition yields a linear range spanning at least about 2, 2.5, 2.7 log or more. In other instances, the reagent composition provided by the present invention yields a detectable signal that is linearly proportional to the amount of nucleic acid present in a sample, wherein the amount ranges from about 1 ng/mL to about 1000 ng/mL of nucleic acid.

In another embodiment, the reagent composition comprises: a light-emitting dye capable of switching from a first conformation to a second conformation, wherein the first conformation represents a first complex formed between said dye and a nucleic acid, and the second conformation represents a second complex formed between said dye and a light-emitting dye modifier, and wherein the light-emitting dye modifier is not covalently bonded to the light-emitting dye, and wherein the first complex is optically detectable at a wavelength in a range from 350 nm to 1200 nm, and the second complex is substantially undetectable at said wavelength. The wavelength can be a fluorescence emission wavelength.

In still another embodiment, the present invention provides a reaction mixture for use in a process for amplifying and detecting a target nucleic acid sequence in a sample which reaction mixture, prior to the amplification, comprises: (a) a light-emitting dye that is capable of binding to a nucleic acid but is not covalently bonded to a polynucleotide or a polypeptide; (b) a light-emitting dye modifier that is substantially incapable of binding to the target nucleic acid, wherein the modifier modifies light emission of said light-emitting dye, and wherein molar ratio of the modifier to the dye present in the reaction mixture is about 0.5, 0.6, 0.7, 0.8, 0.9, 1, 1.1, 1.2, 1.3, 1.4, 1.5, 3, 5, 7, 10 or greater. The dye modifier-to-nucleic acid dye molar ratio can be from about 0.1:1 to about 10:1, from about 0.25:1 to about 8:1, from about 1:1 to about 7:1, or from about 4:1 to about 7:1. In some embodiments, the molar ratio is about 5:1.

In a further embodiment, a reagent composition is provided, which composition comprising: (a) a light-emitting dye capable of binding to nucleic acid; (b) a light-emitting dye modifier that is not covalently bonded to the light-emitting dye the reagent composition permits detection of nucleic acid present in a concentration that is lower than minimum concentration detectable using identical detection means and another reagent composition, said another reagent composition having the light-emitting dye present in the same concentration but lacking said modifier.

In yet another embodiment, the present invention provides a reagent composition comprising: (a) a light-emitting dye capable of binding to a nucleic acid; and (b) a light-emitting dye modifier that is not covalently bonded to the light-emitting dye, wherein the light-emitting dye modifier has a net negative charge (—N), wherein N is between 1 and 4, and wherein a first association constant between said modifier and said dye is less than a second association constant between said dye and said nucleic acid. In some embodiments of the invention, the charge can be determined when molecule is fully dissociated.

In one aspect, any of the reagent compositions disclosed herein can be further characterized by the ability to yield a change in detectable optical signal which is greater than that detectable under the same conditions in the absence of said modifier, when the reagent composition is mixed a sample comprising nucleic acids under condition to yield dye-nucleic acid complexes. In another aspect, when used in a nucleic acid amplification reaction, the reagent composition provided herein does not substantially inhibit such nucleic acid amplification reaction.

The light-emitting dye of the subject reagent compositions is typically capable of binding to DNA, RNA, or a hybrid thereof. It can be an intercalating dye or a minor groove binding dye. The light-emitting dye can be a fluorescent dye. Where desired, the light-emitting dye is substantially quenched when uncomplexed with a nucleic acid molecule. Non-limiting examples of the light-emitting dye are EvaGreen dye, a Hoechst dye, SYBR Green I, BEBO, BOXTO, SYTO9, LC Green Plus, ResoLight and Chromofy.

The light-emitting dye modifier is used in conjunction with a light-emitting dye of the present invention. In one aspect, the light-emitting dye modifier comprises at least two sulfonate groups. In another aspect, the light-emitting dye modifier that can be used in the subject reagent composition includes but is not limited to Coomassie Brilliant Blue R-250, Coomassie Brilliant Blue V-250, Coomassie Brilliant Blue G-250, or Guinea Green B. Where desired, the light-emitting dye modifier is designed to be non-fluorescent or not complexed to a metal. In some instances, the light-emitting dye modifier can be a fluorescent dye and exhibits an absorption maximum wavelength of at least about 10 nm longer or shorter than an absorption maximum wavelength of the light-emitting dye.

The present invention also provides a method of using the subject reagent compositions for detecting the presence or absence of a nucleic acid. The method typically comprises the steps of providing a reagent composition provided herein; in a reaction mixture, allowing said composition to interact with nucleic acids contained within a sample under conditions such that dye-nucleic acid complexes are formed; and detecting an optical signal in said reaction mixture, said optical signal being indicative of the presence of said nucleic acid. Where desired, the method further comprises the step of increasing temperature of the reaction mixture to yield a melting curve profile of the nucleic acid complexes. The melting curve profile of the nucleic acid complexes can permit detection of single nucleotide polymorphism (SNP).

The present invention also provides a method for performing a nucleic acid amplification reaction. The method typically comprises (a) conducting a nucleic acid amplification reaction in the presence of a reagent composition provided herein, which reaction results in an increase in optical signal that is indicative of the presence of amplified nucleic acids; (b) detecting said optical signal. In one aspect, the increase in optical signal is proportional to increase in the amount of amplified nucleic acids resulted from said amplification.

The present invention also provides a kit comprising a reagent composition as provided herein together with instructions describing how to use said reagent composition.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 shows equations that describe the reactions between a dye (O), a dye modifier (M), and a target analyte (T).

FIG. 2A inset graph shows the change in fluorescence as a function of amount of DNA in a well using Hoescht 33258 at 1 μg/mL with and without Coomassie Blue over a range of 0 to about 3 ng/well.

FIG. 3 inset graph shows a graph of change in fluorescence as a function of amount of DNA in a well using Hoescht 33258 at 0.1 μg/mL with and without Coomassie Blue over a range of about 0 to about 8 ng/well.

DETAILED DESCRIPTION OF THE INVENTION

Figure 2A:
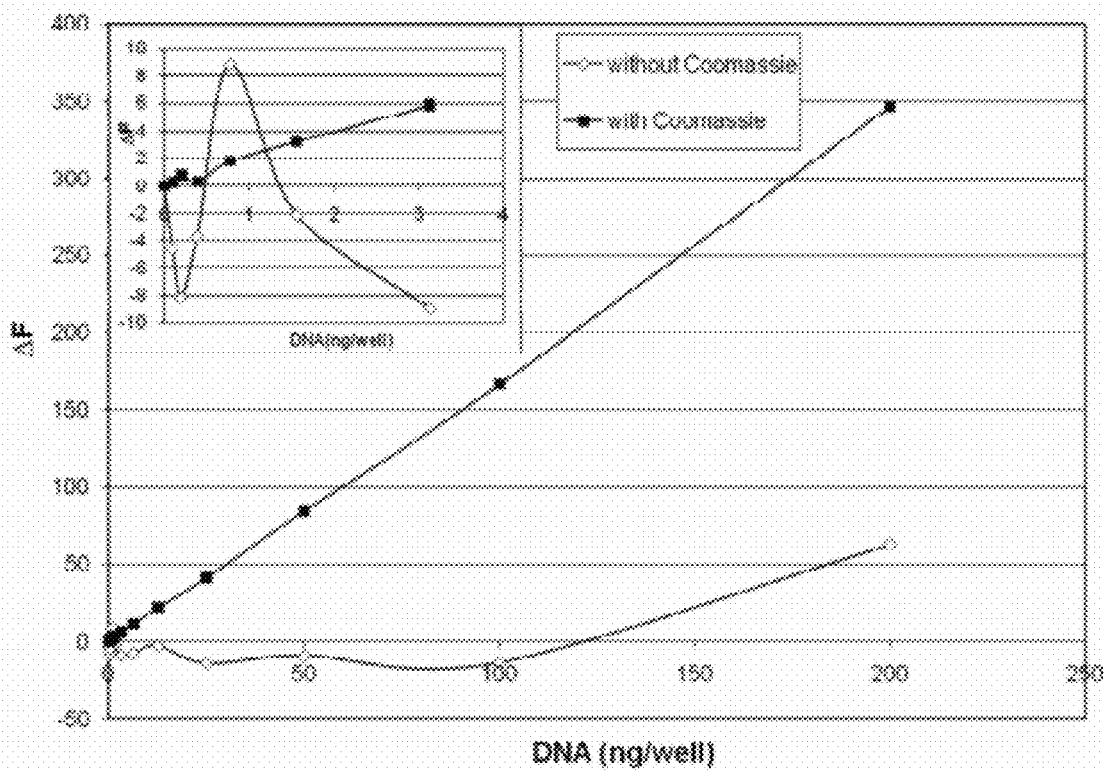
FIG. 2A shows a graph of change in fluorescence as a function of amount of DNA in a well using Hoescht 33258 at 1 μg/mL with and without Coomassie Blue over a range of about 0 to about 200 ng/well.

Generally, the terms "stain" and "dye" may be used interchangeably and refer to a molecule capable of absorbing light in the spectral range of from at least about 250 nm to about 1,200 nm, inclusive. The term "dye" may refer to a light-emitting dye, a fluorescent dye, or a non-fluorescent dye. A light-emitting dye can be a fluorescent dye, a luminescent dye, or a chemi-lumenescent dye. Generally, the term "fluorescent dye" refers to a dye capable of emitting light when excited by another light of appropriate wavelength. The terms fluorescent group, fluorophore, dye or fluorescent group can refer interchangeably to molecules, groups or radicals which are fluorescent. The term "fluorescent", as applied to a molecule, can be used to refer to the property of the compound of absorbing energy (such as UV, visible or IR radiation) and re-emitting at least a fraction of that energy as light over time. Fluorescent groups, compounds or fluorophores can include, but are not limited to discrete compounds, molecules, proteins and macromolecular complexes. Fluorophores can also include compounds that exhibit long-lived fluorescence decay such as lanthanide ions and lanthanide complexes with organic ligand sensitizers.

A "dye modifier", herein also referred to as a modulating agent, can be any molecule that interacts with a dye. A dye modifier can bind with a dye, so as to reduce the effective concentration of free dye. A dye modifier can bind with a dye, so as to compete with another molecule for binding to the dye. The dye modifier may or may not reduce light emission of a given dye. A dye modifier can be a quencher.

A "quencher" can refer to any molecule that is capable of reducing a light emission. It is noted that there are instances where a quencher is not necessarily a FRET quencher. There is not a requirement that a quencher work by a strict FRET mechanism, and indeed, a quencher can function by any mechanism. There is no requirement for a spectral overlap between the fluorophore and the quencher. It is noted that quenching can include dynamic quenching (Forster, Dexter, and the like), and static quenching (ground state complex). Quenching mechanisms can involve energy transfer, photoelectron transfer, proton coupled electron transfer, dimer formation between closely situated fluorophores, transient excited state interactions, collisional quenching, or formation of non-fluorescent ground state species. See, e.g., *Principles of Fluorescence Spectroscopy*, by Joseph Lakowicz; and *Handbook of Fluorescent Probes* by Richard Haugland.

For instance, "quencher moiety" or "quencher" can reduce the detectable emission of radiation, e.g., fluorescent or luminescent radiation, from a source ("donor") that would otherwise have emitted this radiation at a particular $\lambda_{max}$. Exemplary quenchers can reduce the detectable radiation emitted by the source by at least about 50%, by at least about 80%, or by at least about 90%. Certain quenchers may re-emit the energy absorbed from, e.g., a fluorescent dye in a signal characteristic for that quencher and thus a quencher can also be a label. This phenomenon is generally known as fluorescent resonance energy transfer or FRET. Alternatively, a quencher may dissipate the energy absorbed from a fluorescent dye in a form other than light, e.g., as heat. Molecules commonly used in FRET include, for example, fluorescein, FAM, JOE, rhodamine, R6G, TAMRA, ROX, DABCYL, and EDANS. Whether a fluorescent dye is a donor or an acceptor is defined by its excitation and emission spectra, and the fluorescent dye with which it is paired. For example, FAM is most efficiently excited by light with a wavelength of 488 nm, and emits light with a spectrum of 500 to 650 nm, and an emission maximum of 525 nm FAM is a suitable donor label for use with, e.g., TAMRA as a quencher, which has at its excitation maximum 514 nm. Exemplary non-fluorescent or dark quenchers that dissipate energy absorbed from a fluorescent dye include the Black Hole Quenchers™ marketed by Biosearch Technologies, Inc. (Novato, Calif., USA), and the ECLIPSE® Dark Quenchers (Epoch Biosciences, Bothell, Wash., USA). The Black Hole Quenchers™ (BHQ) are structures comprising at least three radicals selected from substituted or unsubstituted aryl or heteroaryl compounds, or combinations thereof, wherein at least two of the residues are linked via an exocyclic diazo bond (see, e.g., International Publication No. WO 01/86001, entitled "DARK QUENCHERS FOR DONOR-ACCEPTOR ENERGY TRANSFER," published Nov. 15, 2001 by Cook et al., which is incorporated by reference). Exemplary quenchers are also provided in, e.g., U.S. Pat. No. 6,465,175, entitled "OLIGONUCLEOTIDE PROBES BEARING QUENCHABLE FLUORESCENT LABELS, AND METHODS OF USE THEREOF," which issued Oct. 15, 2002 to Horn et al., which is incorporated by reference. Quenchers can apply both to molecules that do not re-emit absorbed light as light of a longer wavelength (non-fluorescent) or by re-emitting light at a wavelength that is outside the range that is detected (fluorescent).

Generally, the term "nucleic acid" can refer to double-stranded DNA (dsDNA), single-stranded DNA (ssDNA), double-stranded RNA (dsRNA), single-stranded RNA (ss-RNA), and/or hybrids as well as derivatives thereof. A nucleic acid may be natural or synthetic. The term nucleic acid can refer to a polymer of monomers that can be corresponded to a ribose nucleic acid (RNA) or deoxyribose nucleic acid (DNA) polymer, or analog thereof. This includes polymers of nucleotides such as RNA and DNA, as well as modified forms thereof, peptide nucleic acids (PNAs), locked nucleic acids (LNA™s), and the like. In certain applications, the nucleic acid can be a polymer that includes multiple monomer types, e.g., both RNA and DNA subunits. A nucleic acid can be or include, e.g., a chromosome or chromosomal segment, a vector (e.g., an expression vector), an expression cassette, a naked DNA or RNA polymer, an amplicon, an oligonucleotide, a primer, a probe, etc. A nucleic acid can be e.g., single-stranded, double-stranded, or even triple-stranded.

The term "template nucleic acid" or "target nucleic acid" can refer to a nucleic acid that is to be amplified, detected, or otherwise analyzed.

Generally, the term "nucleic acid stain" or "nucleic acid dye" refers to a dye capable of binding to a nucleic acid to form a dye-nucleic acid complex. In some instances, the nucleic acid stain or dye can be substantially undetectable unless complexed with a nucleic acid. In other instances, the stain or dye is detectable unless quenched by another molecule. A nucleic acid stain or dye can be fluorescent. A fluorescent nucleic acid dye can be only weakly fluorescent by itself, but can become highly fluorescent upon nucleic acid binding. The term fluorescent DNA dye can refer to a dye that becomes fluorescent upon binding to DNA.

As used herein, the term sample can refer to any material subject to analysis. The term sample can refer typically to any type of material of biological origin, for example, any type of material obtained from animals or plants. A sample can be, for example, any fluid or tissue such as blood or serum, and furthermore, can be human blood or human serum. A sample can be cultured cells or tissues, cultures of microorganisms (prokaryotic or eukaryotic), or any fraction or products produced from or derived from biological materials (living or once living). Optionally, a sample can be purified, partially purified, unpurified, enriched or amplified. Where a sample is purified or enriched, the sample can comprise principally one component, e.g., nucleic acid. More specifically, for example, a purified or amplified sample can comprise total cellular RNA, total cellular mRNA, cDNA, cRNA, or an amplified product derived there from.

As used herein, a linear range refers to a range in which a change in measured response is directly proportional to a change in the quantity to be measured. In some instances, the response can deviate from a perfectly linear response. In general, for the purpose of the invention, a suitable linear range typically has an R squared value of at least about 0.9, 0.95, 0.96, 0.97, 0.98, 0.99, 0.995, 0.999, or 0.9999 or higher.

As used herein, the term kit can be used to reference a combination of articles that facilitate a process, method, assay, analysis or manipulation of a sample. Kits can contain written instructions describing how to use the kit (e.g., instructions describing the methods of the present invention), chemical reagents or enzymes required for the method, primers and probes, as well as any other components.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Dyes are useful in various applications, such as in the detection of analytes or the state of analytes. For example, a dye can be used to determine if an analyte is present and/or how much of an analyte is present. Additionally, a dye can be used to determine if an analyte is bound or unbound or the charge state of an analyte. These dyes can be fluorescent dyes or nucleic acid dyes that are useful in various applications, such as routine quantification of nucleic acid in solution, real-time PCR and nucleic acid gel staining, for example. The compositions, systems, and methods described herein can be used to improve the linear detection range, sensitivity, and dynamic range of various dyes. Also described herein are compositions, systems, and methods for improving the sensitivity, linear detection range and nucleic acid binding property of nucleic acid dyes.

The present invention discloses compositions, methods, and systems for detecting nucleic acid using a novel reagent composition comprising a light-emitting dye and a dye modifier. Compared to the same nucleic acid dye without the dye modifier, the novel detection agent has significantly higher sensitivity, wider linear detection range and/or improved nucleic acid binding property.

The reagent composition provided here exhibit one or more unique feature as follows. In one aspect, the reagent composition comprises (a) a light-emitting dye capable of binding to a nucleic acid, wherein the dye is not covalently bonded to a polynucleotide or a polypeptide; and (b) a light-emitting dye modifier that interacts with said dye, wherein said reagent composition produces a detectable signal that is linearly proportional to the amount of nucleic acids present in a sample over a range that is at least about 0.1, 0.2, 0.3, 0.4, 0.5, 0.6, 0.7, 0.8, 0.9, 1.0, 1.2, 1.4, 1.5, 2.0, 2.5 or 2.7 log or greater than that would be linearly detectable by a composition substantially lacking said light-emitting dye modifier. In some instances, the reagent composition yields a linear range spanning at least about 2, 2.5, 2.7 log or more. In other instances, the reagent composition provided by the present invention yields a detectable signal that is linearly proportional to the amount of nucleic acid present in a sample, wherein the amount ranges from about 1 ng/mL to about 1000 ng/mL of nucleic acid.

In another aspect, the reagent composition comprises: a light-emitting dye capable of switching from a first conformation to a second conformation, wherein the first conformation represents a first complex formed between said dye and a nucleic acid, and the second conformation represents a second complex formed between said dye and a light-emitting dye modifier, and wherein the light-emitting dye modifier is not covalently bonded to the light-emitting dye, and wherein the first complex is optically detectable at a wavelength in a range from 350 nm to 1200 nm, and the second complex is substantially undetectable at said wavelength.

In still another aspect, the reagent composition can be a reaction mixture for use in a process for amplifying and detecting a target nucleic acid sequence in a sample which reaction mixture, prior to the amplification, comprises: (a) a light-emitting dye that is capable of binding to a nucleic acid but is not covalently bonded to a polynucleotide or a polypeptide; (b) a light-emitting dye modifier that is substantially incapable of binding to the target nucleic acid, wherein the modifier modifies light emission of said light-emitting dye, and wherein molar ratio of the modifier to the dye present in the reaction mixture is about 0.5 or greater.

In yet still another aspect, the reagent composition comprising: (a) a light-emitting dye capable of binding to nucleic acid; (b) a light-emitting dye modifier that is not covalently bonded to the light-emitting dye the reagent composition permits detection of nucleic acid present in a concentration that is lower than minimum concentration detectable using identical detection means and another reagent composition, said another reagent composition having the light-emitting dye present in the same concentration but lacking said modifier.

In yet another embodiment, the present invention provides a reagent composition comprising: (a) a light-emitting dye capable of binding to a nucleic acid; and (b) a light-emitting dye modifier that is not covalently bonded to the light-emitting dye, wherein the light-emitting dye modifier has a net negative charge (—N), wherein N is between 1 and 4, and wherein a first association constant between said modifier and said dye is less than a second association constant between said dye and said nucleic acid. In some embodiments of the invention, the charge can be determined when molecule is fully dissociated. Alternatively, the charge can be determined under reaction conditions.

Any of the reagent compositions disclosed herein can be further characterized by the ability to yield a change in detectable optical signal which is greater than that detected under the same conditions in the absence of said modifier, when the reagent composition is mixed a sample comprising nucleic acids under condition to yield dye-nucleic acid complexes. In another aspect, when used in a nucleic acid amplification reaction, the reagent composition provided herein does not substantially inhibit such nucleic acid amplification reaction.

A dye can be used to detect a target analyte, as shown as Eq 1 in FIG. 1, where D is a dye, T is a target analyte, and D-T is a dye complexed with a target analyte. In some embodiments, the dye can be detected when complexed to the target analyte.

A dye modifier, indicated as M in FIG. 1, can be augmented to a dye to improve detection characteristics of the dye to create a system represented by the combination of Eq. 2 and 3. The dye modifier can interact with the dye such that a complex can be formed between the dye and the dye modifier, as shown in Eq. 2. This interaction can reduce the effective concentration of dye that is available to form a complex with the target analyte (Eq. 3).

In some embodiments of the invention, the dye, dye modifier, and target analyte can interact as shown in Eq. 4 and 5. In this instance, the dye is not substantially detectable as a free dye, D, or as a dye complexed with the dye modifier. Once the dye is complexed with the target analyte, the dye can be detected, as indicated by the asterisk in Eq. 5.

In other embodiments of the invention, the dye, dye modifier, and target analyte can interact as shown in Eq. 6 and 7. In this instance, dye complexed with the dye modifier is not substantially detectable dye, but free dye and dye complexed with the target analyte is detectable.

In either of the systems represented by Eq. 4 and 5 or Eq. 6 and 7, the dye complexed to the dye modifier is substantially undetectable and the dye complexed to the target analyte, such as a nucleic acid, is detectable.

Any dye, such as a nucleic acid dye, is suitable for the invention. For example, suitable nucleic acid dyes may include many commercially available dyes and those known in the art. A dye can be a fluorescent dye, a nucleic acid dye, or any other dye described herein. The dye can be capable of binding to a target analyte, such as nucleic acids like DNA, RNA, a hybrid thereof, or any other nucleic acid described herein. The dyes can bind to double stranded nucleic acids or double stranded DNA. The dyes can be intercalating dyes or non-intercalating dyes, such as minor groove binding dyes.

As used herein, an intercalating dye can be capable of non-covalent insertion between stacked base pairs in the nucleic acid double helix. Intercalating agents, such as ethidium bromide, fluoresce more intensely when intercalated into double-stranded DNA than when bound to single-stranded DNA, RNA, or in solution. Other intercalating agents exhibit a change in the fluorescence spectra when bound to double-stranded DNA. For example, actinomycin D fluoresces red when bound to single-stranded nucleic acids, and green when bound to a double-stranded template. Whether the detectable signal increases, decreases or is shifted, as is the case with actinomycin D, any intercalating agent that provides a detectable signal that is distinguishable when the agent is bound to double-stranded DNA or unbound is suitable for practicing the disclosed invention. For example, the interaction between DNA and another photoreactive psoralen, 4'-aminomethyl-4,5',8-trimethylpsoralen (AMT) has been described (see Johnson et al. 1981, *Photochem. & Photobiol.*, 33:785-791, which is incorporated herein by reference). According to the reference, both the absorption at long wavelengths and fluorescence decline upon intercalation of AMT into the DNA helix. U.S. Pat. Nos. 4,582,789 and 5,994,056 describe several intercalating moieties including psoralens, which are both incorporated herein by reference.

Non-intercalating DNA binding agents are also suitable. For example, Hoechst 33258 (Searle & Embrey, 1990, *Nuc. Acids Res.* 18(13):3753-3762) exhibits altered fluorescence with increasing amount of target. Hoechst 33258 is a member of a class of nucleic acid-binding compounds commonly referred to as "groove binders" that bind to the groove region of a helical nucleic acid molecule. This group includes drugs like distamycin, netropsin and others. These compounds typically recognize and bind to the minor groove of a helical nucleic acid molecule such as a double-stranded DNA.

The dyes described herein may or may not be complexed with other moieties, such as polynucleotides, polypeptides, and/or dye modifiers. The dye can be a free dye that is not complexed to a binding moiety, such as a binding moiety that exhibits binding to the target analyte. These binding moieties can include antibodies or DNA probes that may or may not exhibit binding to the target analyte.

Suitable nucleic acid dyes include dsDNA-selective and RNA-selective dyes. More specific examples of suitable light-emitting dyes include, but are not limited to, EvaGreen dye, GelRed, GelGreen, SYBR Green I (U.S. Pat. Nos. 5,436, 134 and 5,658,751), SYBR GreenEr, SYBR Gold, LC Green, LC Green Plus, BOXTO, BEBO, SYBR DX, SYTO9, SYTOX Blue, SYTOX Green, SYTOX Orange, SYTO dyes, POPO-1, POPO-3, BOBO-1, BOBO-3, YOYO-1, YOYO-3, TOTO-1, TOTO-3, PO—PRO-1, BO-PRO-1, YO-PRO-1, TO-PRO-1, JO-PRO-1, PO—PRO-3, LO-PRO-1, BO-PRO-3, YO-PRO-3, TO-PRO-3, TO-PRO-5, Ethidium Homodimer-1, Ethidium Homodimer-2, Ethidium Homodimer-3, propidium iodide, ethidium bromide, various Hoechst dyes, DAPI, ResoLight, Chromofy, and acridine homodimer. Merely by way of example, fluorescent RNA- or ssDNA-binding dyes include SYBR Green II, OliGreen, and RiboGreen. Other nucleic acid dyes include those disclosed in U.S. Pat. No. 4,883,867 to Lee (1989), U.S. Pat. No. 5,582, 977 to Yue et al. (1996), U.S. Pat. No. 5,321,130 to Yue et al. (1994), U.S. Pat. No. 5,410,030 to Yue et al. (1995), U.S. Pat. No. 5,863,753, and U.S. Patent Publication Nos. 2006/0211028 and 2008/0145526. Many of the above mentioned dyes are commercially available from Invitrogen, Sigma, Biotium and numerous other companies.

Dye modifiers can interact with dyes to improve detection of a target analyte. A dye modifier can be used to improve the linearity of a measured response to the quantity of a target analyte. A dye modifier can also be used to improve the sensitivity of a dye for detection of low concentrations of a target analyte. A dye modifier can also exhibit binding characteristics to a dye. The dye modifier can affect the ability to detect a dye, e.g., by quenching or activating the dye, or can have no effect on the ability to detect the dye. A dye modifier can increase in detectable signal of a dye in response to the concentration of a target analyte as compared to using the same dye without the dye modifier.

A dye modifier can exhibit little or no binding to a target analyte. The dye modifier can be designed or chosen based on the structure or characteristics of the target analyte such that it does not exhibit binding to the target analyte. The dye modifier may substantially lack or not be complexed to polynucleotides, polypeptides, or a dye. The dye modifier can substantially lack or not be complexed to any binding moities that exhibit binding to the target analyte. These binding moieties can include antibodies or DNA probes that may or may not exhibit binding to the target analyte.

In some embodiments, the dye modifier can be chosen or designed to be repulsive to the target analyte. For example, if the target analyte is anionic or exhibits a net negative charge, e.g., nucleic acids, the dye modifier can be designed or chosen such that it is also anionic or exhibits a net negative charge, thereby utilizing repulsive ionic interactions to prevent interaction between the target analyte and the dye modifier. In some embodiments of the invention, the dye modifier can be designed or chosen such that the dye modifier and the target analyte both have either a net positive or a net negative charge.

In some embodiments, the dye modifier, which can be a quenching agent, can be an anionic dye modifier. Such dye modifier can be used together with a light-emitting dye to increase the signal-to-noise ratio of nucleic acid detection of the light-emitting dye. Herein, an anionic dye refers to a dye whose chromophore excluding any counter ion has at least one net negative charge. In some embodiments of the invention, the dye modifier has a net negative charge (—N), where N is between about 0 and 5, about 0.5 and 5, about 1 and 4, or about 2 and 3. Herein, when N is a non-integer, it takes into account of the fact that some dye modifiers may be either a weak acid or weak base, which may be partially deprotonated or partially protonated under the detection condition. The charge on the dye modifier can be determined for when the dye modifier is fully dissociated. Alternatively, the charge on the dye modifier can be determined or calculated at neutral pH conditions or at the reaction conditions for a particular application, e.g., in a nucleic acid amplification mixture.

The anionic groups on the dye modifier can be sulfonate groups. In general, a dye modifier can comprise 2 or 3 sulfonate groups. Exemplary dye modifiers include but are not limited to the followings: Coomassie Brilliant Blue G250, Coomassie Brilliant Blue R250, Coomassie Brilliant Blue V250, Coomassie Violet R200, FastGreen, Guinea Green B, Patent Blue VF, Xylene Cyanole FF, Acid Violet, Luxol Brilliant Green BL, Lissamine Green B, Erioglaucine, Methyl Purple, Acid Fuchsin, Light Green SF Yellowish and Aniline Blue. Many of these compounds are available from Aldrich Chemicals Co.

Additional dyes suitable for the invention can be generated by measuring the signal-to-noise ratio of a potential nucleic acid detection agent, i.e., the fluorescence intensity ratio of the detection agent in the presence and absence of nucleic acid. In order to best assess the effect of the dye modifier, the signal-to-noise ratio is preferably measured using an amount of nucleic acid close to the detection limit of the nucleic acid dye.

The dye modifier may be either a fluorescent dye or non-fluorescent dye. Preferably, it is non-fluorescent.

If the dye modifier has an absorption wavelength, preferably, the absorption maximum wavelength of the dye modifier is at least 10 nm longer or shorter than the fluorescence emission maximum wavelength of the light-emitting dye capable of binding to nucleic acid. Where desired, separation of the above wavelengths can minimize any inner-filter effect, where the fluorescence of the nucleic acid-bound dye is absorbed by the free dye modifier. Where desired, the wavelength separation is at least 20 nm, at least 30 nm, at least 40 nm, at least 50 nm, or at least 60 nm.

Most nucleic acid dyes have some level of intrinsic or background fluorescence. The background fluorescence lowers the signal-to-noise ratio of nucleic acid detection. More importantly, high background fluorescence makes detecting small quantity of nucleic acid unreliable or sometimes impossible. As an example, Hoechst 33528 is a nucleic acid dye widely used for quantifying dsDNA (Moe, et al. J. Biochem. Biophys. (1994) Methods 28, 263-276; Labarca, et al. (1980) Anal. Biochem. 102, 344-352). The dye can detect as little as 10 ng/mL dsDNA when used at a dye concentration of 0.1 μg/mL. At such relatively low dye concentration, however, it is difficult to accurately detect relatively higher amounts of DNA. To extend the upper end of the assay's dynamic range, a dye concentration of 1 μg/mL is typically used. But the high dye concentration results in very high background fluorescence, sacrificing the accuracy of quantifying low levels of DNA. The dilemma of not being able to reliably detect both high and low levels of DNA using a single dye concentration is successfully resolved in the present invention by using a dye modifier. The dye modifier interacts with the unbound free nucleic acid dye to form a weakly associated complex, which can suppress the intrinsic fluorescence of the dye. The association constant between the dye and the dye modifier can be less than the association constant between the dye and a target analyte, such as a nucleic acid.

Figure 2B:
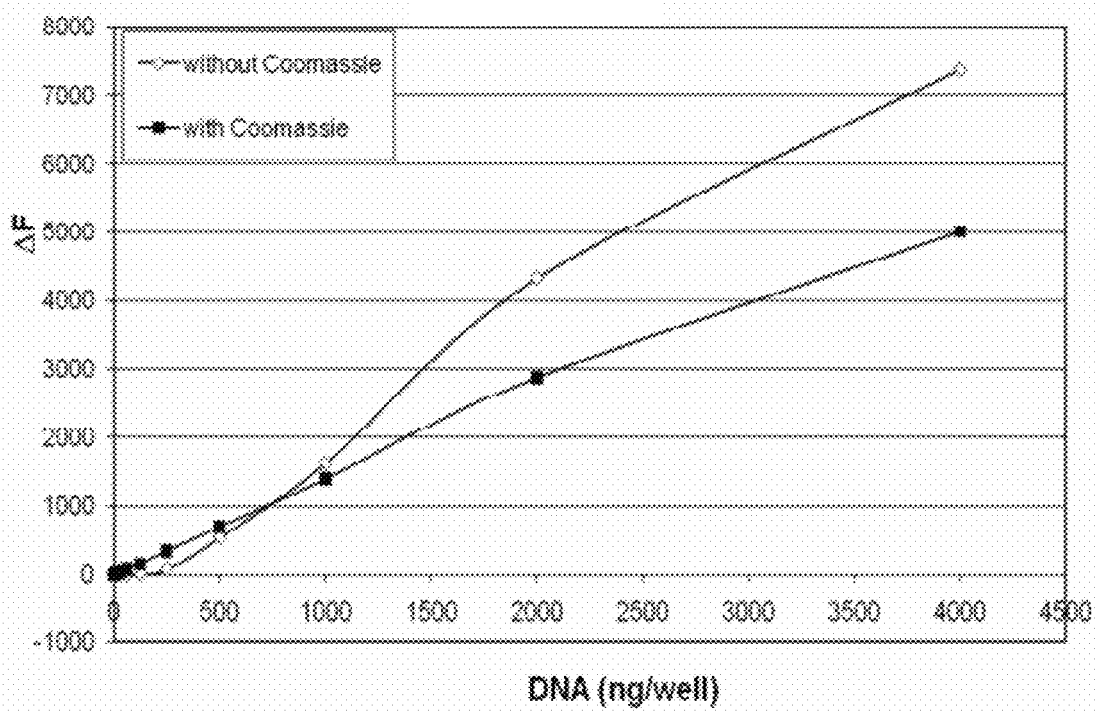
FIG. 2B shows a graph of change in fluorescence as a function of amount of DNA in a well using Hoescht 33258 at 1 μg/mL with and without Coomassie Blue over a range of about 0 to about 4000 ng/well.
Figure 3:
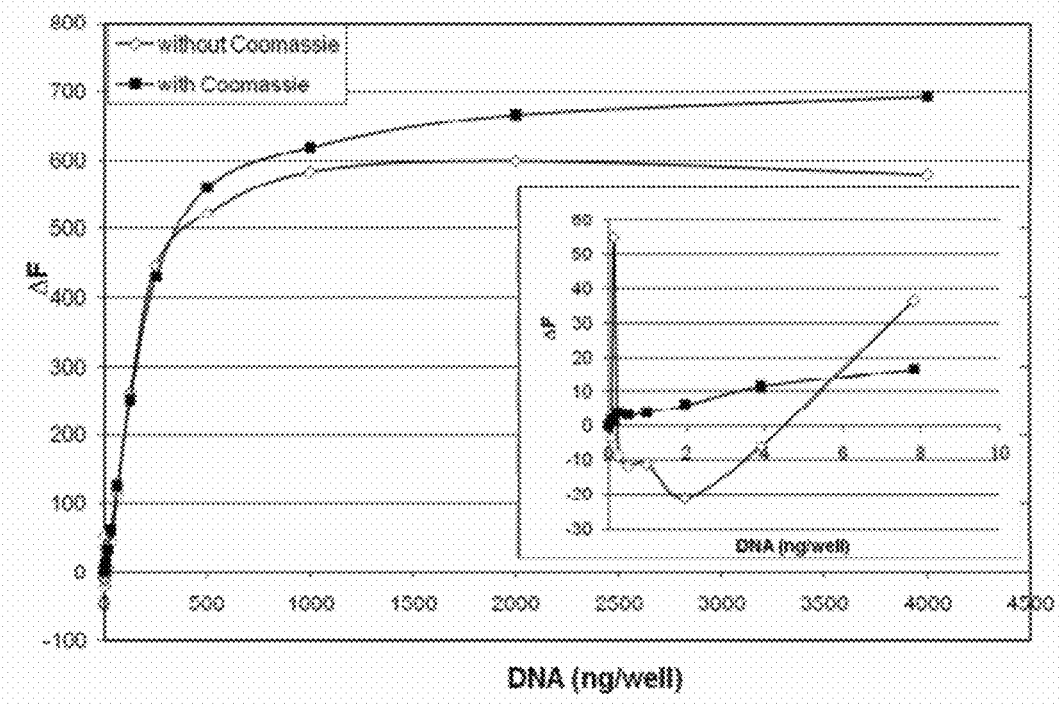
FIG. 3 shows a graph of change in fluorescence as a function of amount of DNA in a well using Hoescht 33258 at 0.1 μg/mL with and without Coomassie Blue over a range of about 0 to about 4000 ng/well.

The dye modifier can have no or minimal interaction with the target analyte. In some embodiments of the invention, the dye modifier, which can be a quencher, is negatively charged. The negative charge on the dye modifier may reduce or minimize interaction with the negatively charged nucleic acid and therefore does not quench the fluorescence of the light-emitting dye when bound to a nucleic acid. FIG. 2A shows that Hoechst 33528 at 1 μg/mL is unreliable to quantify DNA below about 150 ng/well or 750 ng/mL. Reducing the dye concentration down to 0.1 μg/mL increases the detection limit but at the cost of dramatically reducing the dynamic range of the detection to below about 250 ng/mL (FIG. 2B and FIG. 3). When Coomassie Blue is used as the dye modifier at a Coomassie-to-Hoechst molar ratio of 5:1, the lower end of the dynamic detection range is greatly extended for both Hoechst dye concentrations (insets of FIG. 2A and FIG. 3). Adding Coomassie Blue to 1 μg/mL Hoechst 33528 also significantly improves the linearity of the upper end of the detection range, resulting in an unprecedented overall linear detection range from as low as 1 ng (5 ng/mL) or below to as high as 4,000 ng (20,000 ng/mL), as shown in FIG. 2B.

Additional examples of dyes and dye modifier pairs are shown in Table 1. The table lists linear detection ranges under various conditions. The rows in bold are for detections without a dye modifier. The last column shows detection ranges in ΔLog. The log can be calculated by determining the logarithm of the ratio of the highest concentration within the linear detection range over the lowest concentration. For example, if the highest concentration in the linear detection range is 1000 ng/mL and the lowest concentration in the linear detection range is 1 ng/mL, the ΔLog would be equal to log(1000/1) or 3. As can be seen by the data in Table 1 the dye modifier can improve the linear detection range by at least about 0.05, 0.1, 0.2, 0.3, 0.4, 0.5, 0.6, 0.7, 0.8, 0.9, or 1 log. Improvement by "x" log can mean that the ΔLog of the linear range of detection has increased by "x" units. For example, the ΔLog for EvaGreen Dye using no modulating agent is 1.7 and the ΔLog for EvaGreen Dye using Coomassie Blue R-250 at a molar ratio of 1/1 is 2.4. The use of EvaGreen Dye with Coomassie Blue R-250 at a molar ratio of 1/1 is about a 0.7 log improvement over the use of EvaGreen Dye without Coomassie Blue R-250. The conditions used to compare dye combinations, e.g., with and without a dye modifier, can be the same conditions. For example, the detection system and the other components in the sample being measured can be identical.

TABLE 1

Linear range of DNA detection using a DNA-binding dye or a combination of a DNA-binding dye and a modulating agent.

| DNA dye | DNA dye concentration | Modulating agent | Modulating agent/DNA dye molar ratio | Linear detection range* | Linear detection range in ΔLog* |
|---|---|---|---|---|---|
| EvaGreen dye | 0.63 μM | (no modulating agent) | 0 | 1 ng-50 ng (5-250 ng/mL) | 1.7 |
| EvaGreen dye | 0.63 μM | Coomassie Blue R-250 | 1/1 | 0.2 ng-50 ng (1-250 ng/mL) | 2.4 |
| EvaGreen dye | 0.63 μM | Coomassie Blue R-250 | 2/1 | 0.2 ng-100 ng (1-500 ng/mL) | 2.7 |
| EvaGreen dye | 0.63 μM | Coomassie Blue R-250 | 5/1 | 0.2 ng-100 ng (1-500 ng/mL) | 2.7 |
| EvaGreen dye | 1.25 μM | (no modulating agent) | 0 | sigmoidal | ~0 |

TABLE 1-continued

Linear range of DNA detection using a DNA-binding dye or a combination of a DNA-binding dye and a modulating agent.

| DNA dye | DNA dye concentration | Modulating agent | Modulating agent/DNA dye molar ratio | Linear detection range* | Linear detection range in ΔLog* |
|---|---|---|---|---|---|
| EvaGreen dye | 1.25 μM | Coomassie Blue R-250 | 5/1 | 0.5 ng-250 ng (2.5-1250 ng/mL) | 2.7 |
| EvaGreen dye | 0.63 μM | Guinea Green B | 2.5/1 | 0.2 ng-100 ng (1-500 ng/mL) | 2.7 |
| EvaGreen dye | 0.63 μM | Guinea Green B | 5/1 | 0.2 ng-100 ng (1-500 ng/mL) | 2.7 |
| EvaGreen dye | 0.63 μM | Guinea Green B | 10/1 | 0.2 ng-100 ng (1-500 ng/mL) | 2.7 |
| Hoechst 33258 | 1 μg/mL | (no modulating agent) | 0 | 4 ng-1000 ng (20-5000 ng/mL) | 2.4 |
| Hoechst 33258 | 1 μg/mL | Coomassie Blue R-250 | 5/1 | 2 ng-2000 ng (10-10000 ng/mL) | 3.0 |

*Linear ranges were determined using an $R^2$ criteria of ≧ 0.99.

Figure 4A:
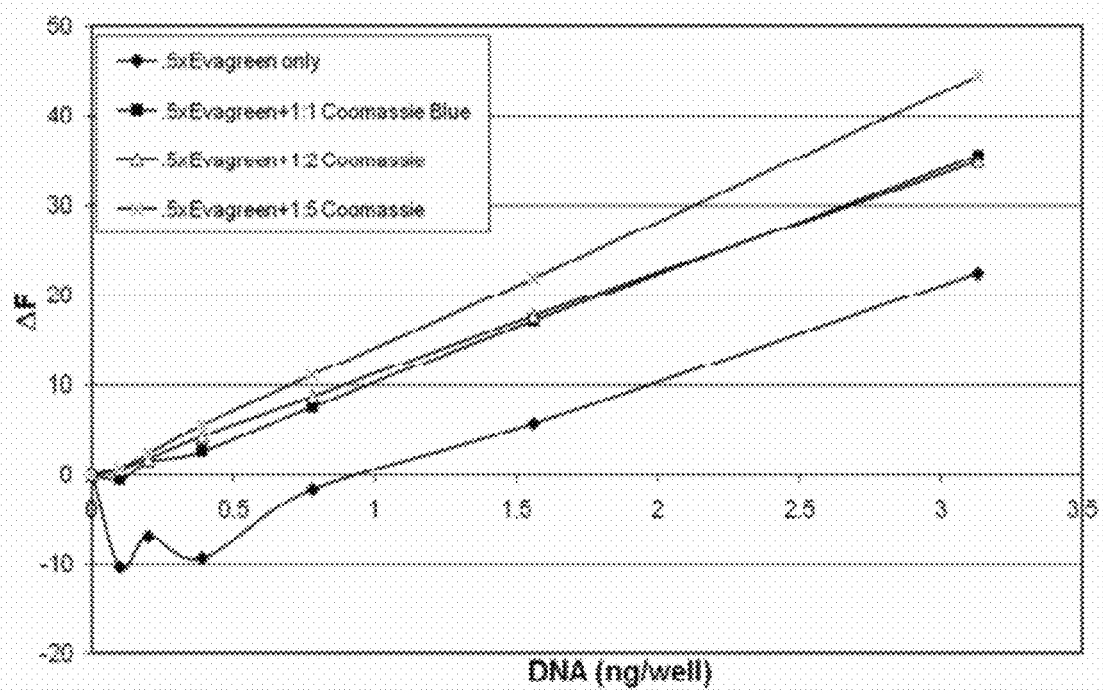
FIG. 4A shows a graph of change in fluorescence as a function of amount of DNA in a well using EvaGreen at 0.5× concentration and varying amounts of Coomassie Blue over a range of about 0 to about 3 ng/well.
Figure 4B:
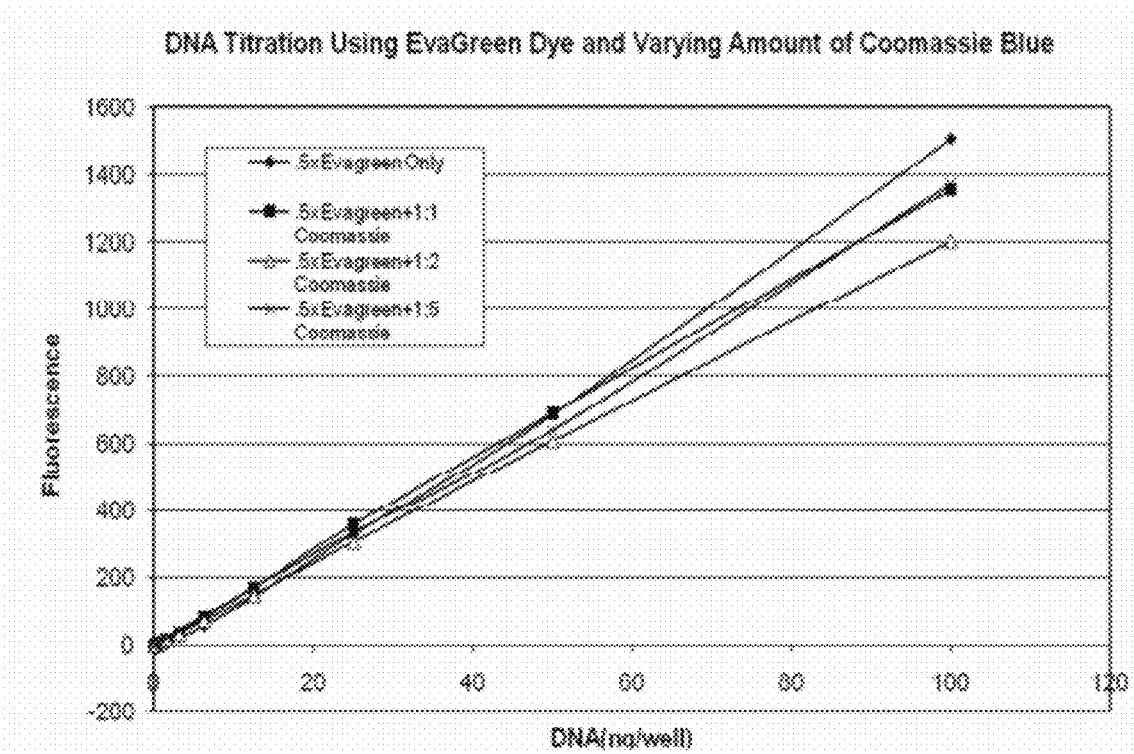
FIG. 4B shows a graph of change in fluorescence as a function of amount of DNA in a well using EvaGreen at 0.5× concentration and varying amounts of Coomassie Blue over a range of about 0 to about 100 ng/well.

The benefit of a dye modifier is further illustrated by the dramatic improvement of DNA detection sensitivity with EvaGreen dye, a dsDNA-binding dye now widely used for real-time PCR, DNA melt curve analysis and numerous other applications. Use of a given dye in conjunction with a dye modifier can allow for detection of a concentration of target analyte that is lower than when the given dye is used without the dye modifier. The concentration that can be detected can be measured under identical conditions or using identical detection systems and methods. As shown in FIG. 4A, EvaGreen dye alone is unable to detect <1 ng dsDNA. However, when Coomassie Blue is added as the dye modifier at a Coomassie Blue-to-EvaGreen ratio of about 1:1, 2:1 or 5:1, detection sensitivity is improved to <0.5 ng when measured on a regular microplate reader. In particular, when the Coomassie Blue-to-EvaGreen ratio is about 5:1, the detection sensitivity is improved to at least as high as 0.1 ng with a linear detection range extending to at least 100 ng (FIG. 4A and FIG. 4B). The dye modifier is not limited to Coomassie Blue. FIG. 5 shows that the sensitivity of EvaGreen dye in nucleic acid detection is also significantly enhanced when another dye modifier Guinea Green B is used. Other pairs of light-emitting dye and dye modifiers disclosed herein are also applicable for the present invention.

The dye modifier-to-nucleic acid dye molar ratio can be from about 0.1:1 to about 10:1, preferably from about 0.25:1 to about 8:1, more preferably from about 1:1 to about 7:1, most preferably from about 4:1 to about 7:1. In some preferred embodiments, the molar ratio is about 5:1. In other embodiments of the invention, the molar ratio of the dye modifier to the dye can be at least about 0.5, 0.6, 0.7, 0.8, 0.9, 1, 1.1, 1.2, 1.3, 1.4, 1.5, 3, 5, 7, or 10.

In some embodiments of the invention, the dye can be substantially undetectable when not bound to a target analyte. The dye can be undetectable due to interaction with a quenching dye, such that the dye is substantially quenched when unbound to a target analyte. These conditions can be determined by the binding affinity between the dye and the dye modifier, and/or the molar ratio of the components in the system, including the dye, the dye modifier, and the target analyte. In some embodiments, the dye is only detectable when bound to the target analyte.

In some embodiments, the invention provides a nucleic acid detection agent comprising a nucleic acid binding dye and a dye modifier capable of enhancing the signal-to-noise ratio of nucleic acid detection, wherein the dye modifier comprises 2 or 3 sulfonate groups. Preferably, the dye modifier is selected from the group consisting of Coomassie Brilliant Blue G250, Coomassie Brilliant Blue R250, Coomassie Violet R200, FastGreen, Guinea Green B, Patent Blue VF, Xylene Cyanole FF, Acid Violet, Luxol Brilliant Green BL, Lissamine Green B, Erioglaucine, Methyl Purple, Acid Fuchsin, Light Green SF Yellowish and Aniline Blue.

The light-emitting dye and the dye modifier can be premixed before adding the mixture to a sample of target nucleic acids to be detected. However, one can also first add the dye modifier to the sample of target nucleic acids. The sequence of combining the components is generally not critical.

Methods

The reagent compositions described herein can be used for the detection of a target analyte, including but not limited to target nucleic acids. In some embodiments of the invention, the reagent compositions allow for improved detection of a target analyte by improving the sensitivity, range of linear detection, or range of dynamic response of a given dye to the concentration of a target analyte. The reagent compositions can include a dye modifier that exhibits binding to a dye, thereby reducing the effective concentration of free dye in a reaction mixture. The dye modifier can reduce the inhibitory effects of a dye to a specific reaction, such as nucleic acid amplification.

In one embodiment, the present invention provides a method of using the subject reagent compositions for detecting the presence or absence of a nucleic acid. The method typically comprises the steps of (a) providing a reagent composition disclosed herein; (b) in a reaction mixture, allowing said composition to interact with nucleic acids contained within a sample under conditions such that dye-nucleic acid complexes are formed; and (c) detecting an optical signal in said reaction mixture, said optical signal being indicative of the presence of said nucleic acid.

In a separate embodiment, the present invention provides a method for performing a nucleic acid amplification reaction. The method typically comprises (a) conducting a nucleic acid amplification reaction in the presence of a reagent composition disclosed herein, which reaction results in an increase in optical signal that is indicative of the presence of amplified nucleic acids; (b) detecting said optical signal. In one aspect, the increase in optical signal is proportional to increase in the amount of amplified nucleic acids resulted from said amplification. As used herein, nucleic acid amplification reaction encompasses PCR, quantitative polymerase chain reaction (qPCR), isothermal nucleic acid amplification, nucleic acid sequencing, ligase chain polymerase chain reaction (LCR-PCR), reverse transcription PCR reaction (RT-PCR), reverse transcription, and nucleic acid ligation.

The methods of nucleic acid detection and/or amplification can be associated with a variety of practical applications. According to one embodiment, the method is associated with routine quantification of nucleic acid in solution. Examples of such application include quantifying yields of purified DNA fragments for subcloning or for use as transcription templates, quantifying yields from cDNA library production, quantifying DNA amplification products or DNA input for PCR, detecting DNA contamination in protein drug preparation produced from recombinant organisms, and quantifying forensic DNA samples extracted from various biological samples. The detection of nucleic acid in solution may be performed on a variety of fluorescence-based detection systems, including but not limited to microplate readers, hand-held portable meters, bench-top spectrofluorometers, or instruments that employ microfluidic chips.

According to another embodiment, the nucleic acid detection is associated with detection of nucleic acid immobilized in a gel, such as an agarose gel or polyacrylamide gel. In such a method, a nucleic acid sample is first separated by gel electrophoresis. The gel containing the separated sample can then be incubated in a staining solution comprising the nucleic acid detection agent of the invention for a time sufficient for effecting the staining (typically, 5-60 minutes). The gel can optionally be destained and then viewed or imaged using optical setting compatible with the spectral property of the nucleic acid dye.

In another embodiment, the subject reagent compositions are used in a real-time polymerase chain reaction (qPCR), wherein the nucleic acid detection agent of the invention detects the amplified PCR products in real-time as the polymerization reaction proceeds. Real-time PCR using a nucleic acid detection agent of the invention may offer a number of benefits. Because the nucleic acid detection agent of the invention is highly sensitive, the number of cycle time required for detecting a target nucleic acid (i.e., Ct value) may be reduced. A second benefit is the subject reagent composition exhibits less inhibition of PCR. It is well known that nucleic acid dyes used in qPCR may interfere with the amplification process, particularly when the dyes are used at a relatively high concentration and/or the amount of target DNA is very small (Mao F, Leung W Y and Xin X, "Characterization of EvaGreen and the implication of its physiochemical properties for qPCR," BMC Biotechnol. (2007), 7, 76). In order to minimize PCR inhibition, the nucleic acid concentration of dye binding is often lowered at the cost of reduced PCR signal strength. One effect of the subject dye modifier is the lowering of the apparent concentration or DNA-binding affinity of the dye by making the dye less available when it is not needed, e.g. when the concentration of the amplified template nucleic acid is low. The reduced dye availability can be particularly helpful during the early phase of PCR, where the high dye-to-amplicon ratio is most likely to cause PCR inhibition. However, as the PCR proceeds, the nucleic acid dye dissociates from the dye modifier and migrates to the amplicon in growing copies. Another consequence of PCR interference by a nucleic acid dye at high concentration is formation of nonspecifically amplified PCR products (Mao F, Leung W Y and Xin X, "Characterization of EvaGreen and the implication of its physiochemical properties for qPCR," BMC Biotechnol. (2007), 7, 76). Without being bound by a particular theory or mechanism, the subject reagent composition improves sensitivity and/or specificity of a PCR analysis of target nucleic acid.

In yet another embodiment, the subject reagent composition can be used in a DNA melt curve analysis, a technique commonly used to analyze the product of a DNA amplification reaction. The DNA melt curve analysis can be performed on the same reaction mixture used in the nucleic acid amplification reaction. In some embodiments of the invention, no components are added or removed from the reaction mixture between the nucleic acid amplification reaction and the melt curve analysis.

DNA melt curve analysis can reveal the number of DNA species or purity of an amplification reaction, and thus is often used as a more convenient alternative to gel electrophoresis to confirm the specificity of PCR. According to one embodiment, the nucleic acid detection is associated with high resolution melt curve analysis (HRM). Compared to regular DNA melt curve analysis, HRM can yield more information on the amplified DNA product, including the capability to detect single mutation in the target sequence such as single nucleotide polymorphism (SNP) (U.S. Pat. No. 7,387,887). For a nucleic acid dye to be useful for HRM, it is typically used at relatively high concentration so as to avoid so-called "dye redistribution" problem. Because most nucleic acid dyes exhibit significant PCR inhibition at relatively high concentration, only a few selected dyes, such as EvaGreen dye, SYTO9, ResoLight, and LC Green, are suitable for HRM, where the nucleic acid dye is often added to the reaction prior to PCR. The nucleic acid detection agent of the invention is uniquely suited for HRM application because, in part, its low PCR inhibition propensity and therefore the capacity to be used at relatively high concentration for PCR.

As used herein, the term "$T_m$" can be used in reference to the melting temperature. The melting temperature can be the temperature at which one half of a population of double-stranded polynucleotides or nucleobase oligomers (e.g., hybridization complexes), in homoduplexes or heteroduplexes, become dissociated into single strands. The prediction of a $T_m$ of a duplex polynucleotide can take into account the base sequence as well as other factors including structural and sequence characteristics and nature of the oligomeric linkages.

A $T_m$ can be determined from a melting curve. In some instances, a duplex nucleic acid molecule is heated in a controlled temperature program, and the state of association/dissociation of the two single strands in the duplex is monitored and plotted until reaching a temperature where the two strands are completely dissociated. The $T_m$ can be determined from this melting curve. Alternatively, $T_m$ can be determined by an annealing curve, where a duplex nucleic acid molecule is heated to a temperature where the two strands are completely dissociated. The temperature can then be lowered in a controlled temperature program, and the state of association/dissociation of the two single strands in the duplex is monitored and plotted until reaching a temperature where the two strands are completely annealed. The $T_m$ can be determined from this annealing curve. These methods of determining the melting temperature can be combined or varied. The invention is not limited to any particular method for the determination of $T_m$. Exemplary methods for the experimental determination of $T_m$ are described in a variety of sources, e.g., Liew et al., "Genotyping of Single-Nucleotide Polymorphism by High-Resolution Melting of Small Amplicons," Clinical Chemistry 50(7):1156-1164 (2004); Reed and Wittwer, "Sensitivity and Specificity of Single-Nucleotide Polymorphism Scanning by High-Resolution Melting Analysis," Clinical Chemistry 50(10):1748-1754 (2004); Zhou et al., "Closed- Tube Genotyping with Unlabeled Oligonucleotide Probes and a Saturating DNA Dye," Clinical Chemistry 50(8):1328-1335 (2004); and Zhou et al., "High-resolution DNA melting curve analysis to establish HLA genotypic identity," Tissue Antigens 64:156-164 (2004). Melting/annealing curve analysis instrumentation is commercially available from a variety of manufacturers.

The target nucleic acid that can be analyzed by one or more of the subject methods encompasses any reaction samples suspected to contain the target sequence. It is not intended to be limited as regards to the source of the reaction sample or the manner in which it is made. Generally, the test sample can be biological and/or environmental samples. Biological samples may be derived from human, other animals, or plants, body fluid, solid tissue samples, tissue cultures or cells derived therefrom and the progeny thereof, sections or smears prepared from any of these sources, or any other samples suspected to contain the target nucleic acids. Preferred biological samples are body fluids including but not limited to blood, urine, spinal fluid, cerebrospinal fluid, sinovial fluid, ammoniac fluid, semen, and saliva. Other types of biological sample may include food products and ingredients such as vegetables, dairy items, meat, meat by-products, and waste. Environmental samples are derived from environmental material including but not limited to soil, water, sewage, cosmetic, agricultural and industrial samples.

Systems

The invention provides for systems that can be used to detect target analytes, such as nucleic acids. The system can include at least one detector (e.g., a spectrometer, etc.) that detects a signal that is indicative of a target analyte. For example, the system can include a detector for measuring an optical signal, such as fluorescence. In addition, the system can include at least one thermal modulator (e.g., a thermal cycling device, etc.) operably connected to a container or solid support to modulate temperature of a sample. The thermal modulator can be used for performing nucleic acid amplification methods, melting curve analysis, and/or hybridization assays.

Detectors can be structured to detect detectable signals produced, e.g., in or proximal to another component of the given assay system (e.g., in container, on a solid support, etc.). Suitable signal detectors that are optionally utilized, or adapted for use, herein detect, e.g., fluorescence, phosphorescence, radioactivity, absorbance, refractive index, luminescence, mass, or the like. Detectors optionally monitor one or a plurality of signals from upstream and/or downstream of the performance of, e.g., a given assay step. For example, detectors optionally monitor a plurality of optical signals, which correspond to real-time events. Example detectors or sensors include photomultiplier tubes, CCD arrays, optical sensors, temperature sensors, pressure sensors, pH sensors, conductivity sensors, scanning detectors, or the like. More specific exemplary detectors that are optionally utilized in performing the methods of the invention include, e.g., resonance light scattering detectors, emission spectroscopes, fluorescence spectroscopes, phosphorescence spectroscopes, luminescence spectroscopes, spectrophotometers, photometers, and the like. Detectors are also described in, e.g., Skoog et al., *Principles of Instrumental Analysis,* 5$^{th}$ Ed., Harcourt Brace College Publishers (1998) and Currell, *Analytical Instrumentation: Performance Characteristics and Quality*, John Wiley & Sons, Inc. (2000), both of which are incorporated by reference.

The systems of the invention can include controllers that are operably connected to one or more components (e.g., detectors, thermal modulators, fluid transfer components, etc.) of the system to control operation of the components. More specifically, controllers can be included either as separate or integral system components that are utilized, e.g., to receive data from detectors, to effect and/or regulate temperature in the containers, to effect and/or regulate fluid flow to or from selected containers, or the like. Controllers and/or other system components is/are optionally coupled to an appropriately programmed processor, computer, digital device, or other information appliance (e.g., including an analog to digital or digital to analog converter as needed), which can function to instruct the operation of these instruments in accordance with preprogrammed or user input instructions, receive data and information from these instruments, and interpret, manipulate and report this information to the user. Controllers are available from various commercial sources.

Any controller or computer optionally includes a monitor, which is often a cathode ray tube ("CRT") display, a flat panel display (e.g., active matrix liquid crystal display, liquid crystal display, etc.), or others. Computer circuitry is often placed in a box, which includes numerous integrated circuit chips, such as a microprocessor, memory, interface circuits, and others. The box also optionally includes a hard disk drive, a floppy disk drive, a high capacity removable drive such as a writeable CD-ROM, and other common peripheral elements. Inputting devices such as a keyboard or mouse optionally provide for input from a user.

The computer can include appropriate software for receiving user instructions, either in the form of user input into a set of parameter fields, e.g., in a GUI, or in the form of preprogrammed instructions, e.g., preprogrammed for a variety of different specific operations. The software then converts these instructions to appropriate language for instructing the operation of one or more controllers to carry out the desired operation. The computer then receives the data from, e.g., sensors/detectors included within the system, and interprets the data, either provides it in a user understood format, or uses that data to initiate further controller instructions, in accordance with the programming, e.g., such as controlling fluid flow regulators in response to fluid weight data received from weight scales or the like.

In some embodiments, the invention provides integrated systems for performing quantitative PCR and for making $T_m$ determinations. The systems can include instrumentation and tools for interpreting and analyzing collected data, especially including tools for determining quantity of amplified nucleic acids and for deriving $T_m$. These tools can include algorithms and/or the ability to electronically store information (e.g., collected fluorescence data, predetermined $T_m$ correlations, etc). Each part of an integrated system can be functionally interconnected, and in some cases, physically connected. In some embodiments, the integrated system is automated, where there is no requirement for any manipulation of the sample or instrumentation by an operator following initiation of the qPCR or $T_m$ analysis.

A system of the invention can include instrumentation. For example, the invention can include a detector such as a fluorescence detector (e.g., a fluorescence spectrophotometer). A detector or detectors can be used in conjunction with the invention, e.g., to monitor/measure the emission from a light emitting moiety, such as a nucleic acid dye. A detector can be in the form of a multiwell plate reader to facilitate the high-throughput capacity of the assays described herein.

In some embodiments, the integrated system includes a thermal cycling device, or thermocycler, for the purpose of controlling the temperature of the $T_m$ melting analysis or for modulating the temperature for performing nucleic acid amplification. In some embodiments, the thermal cycling device and the detector are an integrated instrument, where the thermal cycling and emission detection (e.g., fluorescence detection) are performed in the same device.

A detector, e.g., a fluorescence spectrophotometer, can be connected to a computer for controlling the spectrophotometer operational parameters (e.g., wavelength of the excitation and/or wavelength of the detected emission) and/or for storage of data collected from the detector (e.g., fluorescence measurements during a melting curve analysis). The computer may also be operably connected to the thermal cycling device to control the temperature, timing, and/or rate of temperature change in the system. The integrated computer can also contain the "correlation module" where the data collected from the detector is analyzed and where the $T_m$ of the target hybridization complex and/or the concentration of amplified or target nucleic acid is determined. In some embodiments, the correlation module comprises a computer program that calculates the $T_m$ or the concentration of nucleic acid based on the fluorescence readings from the detector, and in some cases, optionally derives sequence and/or genotype information of an unknown sample based on the $T_m$ and/or qPCR result. In some embodiments, the correlation module compares the $T_m$ of the unknown sample with a database (or table) of $T_m$ values for known sequences and/or genotypes to make a correlation between the $T_m$ of the unknown sample and the sequence or genotype of the unknown sample.

In some aspects, a system of the invention for the determination of a $T_m$ of a hybridization complex and/or for performing qPCR comprises a reagent composition, a thermal control device for regulating the temperature reaction over a range of temperatures, and a detector for measuring the signal from the melting reaction over the range of temperatures. In some cases, the system also includes a correlation module that is operably coupled to the detector and receives signal measurements, where the correlation module correlates the signal intensity with the concentration of the target analyte or the melting temperature of the target analyte.

Kits

The present invention provides a kit for detecting and/or quantifying nucleic acid in a sample, the kit comprising a dye and a dye modifier as described above and an instruction manual. In some embodiments the kit can also comprise any of the following: a buffer, a set of nucleic acid standards with known concentrations for generating a standard curve, a test sample. Two or more of the kit components may be packaged within the same container. Preferably, a dye, a dye modifier, and a buffer are provided as a single combined solution.

The present invention also provides for amplification reagent mixture comprising a reagent composition of the present invention, dNTPs, a polymerase, PCR buffer and a technical manual. The PCR buffer may optionally comprise one or more enzyme stabilizers, one or more agents for optimizing the PCR performance and a reference dye, such as ROX, for instrument calibration.

Any DNA and/or RNA polymerases can be included in the amplification reagent mixture. The polymerases can be natural or recombinant such as Taq polymerase, Pfu polymerase, T7 DNA polymerase, Klenow fragment of E. coli DNA polymerase, Tma DNA polymerase, exo-Tli DNA polymerase, exo-KOD DNA polymerase, exo-JDF-3 DNA polymerase, exo-PGB-D DNA polymerase, U1 Tma (N-truncated) Thermatoga martima DNA polymerase, Sequenase, and/or RNA polymerases such as reverse transcriptase. Polymerases capable of strand-displacement can also be included in a nucleic acid amplification reaction.

The examples below are for the purpose of illustrating the practice of the invention. They shall not be construed as being a limitation on the scope of the invention or claims.

EXAMPLES

Example 1

Comparison of DNA Quantitation by a Light-Emitting Dye with and without a Dye Modifier The sensitivity and linearity of a light-emitting dye, such as Hoescht 33258 dye at 1 μg/mL for quantitation of DNA can be improved using Coomassie Blue R250 as a dye modifier at a molar ratio of 1:5, as evidenced by the graphs shown in FIG. 2A and FIG. 2B. FIG. 2A and FIG. 2B compare the linearity and dynamic range of DNA quantitation using Hoechst 33258 with and without Coomassie Blue. FIG. 2A compares a low range of DNA quantitation (from 0 to 200 ng) using 1 μg/mL Hoechst 33258 with and without Coomassie Blue. Inset graph of FIG. 2A depicts the lower range of the DNA titration. FIG. 2B compares a wider dynamic range of DNA quantitation (from 0 to 4000 ng) using 1 μg/mL Hoechst 33258 with and without Coomassie Blue.

The data shown in FIG. 2A was obtained under the following conditions: Hoechst 33528 at 1 ug/mL with and without a 1:5 molar ratio of Coomassie Blue R250 was prepared in 1×TE buffer (10 mM Tris, 1 mM EDTA, pH 7.5). 10 μL of 2-fold dilutions of calf thymus dsDNA starting at 20 ng/μL (200 ng/well) were prepared in a total volume of 200 μL per well. Titrations were performed in black 96-well plates, incubated for 30 minutes at room temperature and read at 350 nm excitation and 460 nm emission using a Molecular Devices Gemini XS fluorescence plate reader. Triplicate samples were averaged and subtracted from background (no DNA) and fluorescence values were plotted against DNA (ng/well). Inset graph depicts the lower range of the DNA titration.

The data shown in FIG. 2B was obtained under the following conditions: Hoechst 33528 at 1 ug/mL with and without a 1:5 molar ratio of Coomassie Blue R250 was prepared in 1×TE buffer (10 mM Tris, 1 mM EDTA, pH 7.5). 10 μL of 2-fold dilutions of calf thymus dsDNA starting at 400 ng/μL (4000 ng/well) were prepared in a total volume of 200 μL per well. Titrations were performed in black 96-well plates, incubated for 30 minutes at room temperature and read at 350 nm excitation and 460 nm emission using a Molecular Devices Gemini XS fluorescence plate reader. Duplicate samples were averaged and subtracted from background (no DNA) and fluorescence values were plotted against DNA (ng/well).

Example 2

Comparison of DNA Quantitation by Hoechst 33258 at 0.1 μG/mL with and without Coomassie Blue as a Modulating Reagent The sensitivity and dynamic range of Hoescht 33258 dye at 0.1 μg/mL for quantitation of DNA can be improved using Coomassie Blue R250 as a dye modifier at a molar ratio of 1:5, as evidenced by the graphs shown in FIG. 3. FIG. 3 compares the linearity and sensitivity of DNA quantitation using 0.1 μg/mL of Hoechst 33258 with and without Coomassie Blue. These data show that reducing the Hoechst 33258 dye concentration down to 0.1 μg/mL increases the lower detection limit, but also reduces the dynamic range of detection. Moreover, the addition of Coomassie Blue improves the linearity of the assay at the lower DNA titration range, and increases the dynamic range of detection.

The data shown in FIG. 3 was obtained under the following conditions: Hoechst 33528 at 0.1 ug/mL with and without a 1:5 molar ratio of Coomassie Blue R250 was prepared in 1×TE buffer (10 mM Tris, 1 mM EDTA, pH 7.5). 10 µL of 2-fold dilutions of calf thymus dsDNA starting at 400 ng/µL (4000 ng/well) were prepared in a total volume of 200 µL per well. Titrations were performed in black 96-well plates, incubated for 30 minutes at room temperature and read at 350 nm excitation and 460 nm emission using a Molecular Devices Gemini XS fluorescence plate reader. Duplicate samples were averaged and subtracted from background (no DNA) and fluorescence values were plotted against DNA (ng/well). FIG. 3 inset graph depicts the lower range of the DNA titration.

Example 3

Comparison of DNA Quantitation by EvaGreen with and without Coomassie Blue as a Modulating Reagent The sensitivity and linearity of EvaGreen dye at 0.5× can be improved using Coomassie Blue R250 as a dye modifier, as evidenced by the graphs shown in FIG. 4A and FIG. 4B. FIG. 4A and FIG. 4B compare the sensitivity and linearity of DNA quantitation using EvaGreen with varying amounts of Coomassie Blue. Coomassie Blue was either omitted or added at 1:1, 1:2 or 1:5 (modulating agent/dye) molar ratio to a solution of EvaGreen. FIG. 4A depicts the lower range of DNA quantitation from 0 to 3 ng. FIG. 4B depicts a wider dynamic range of DNA quantitation from 0 to 100 ng. These data show that the addition of Coomassie Blue improves the lower detection limit and sensitivity of DNA quantitation by EvaGreen alone. Also importantly, these data illustrate that the use of a modulating reagent to increase sensitivity and linearity of DNA quantitation is applicable to various dyes.

The data shown in FIG. 4A and FIG. 4B was obtained under the following conditions: 0.5× EvaGreen with and without a 1:1, 1:2 or 1:5 molar ratio of Coomassie Blue R250 was prepared in 1×TE buffer (10 mM Tris, 1 mM EDTA, pH 7.5). 10 µL of 2-fold dilutions of salmon sperm dsDNA starting at 10 ng/µL (100 ng/well) were prepared in a total volume of 200 µL per well. Titrations were performed in black 96-well plates, incubated for 30 minutes at room temperature and read at 485 nm excitation and 530 nm emission using a Molecular Devices Gemini XS fluorescence plate reader. Triplicate samples were averaged and subtracted from background (no DNA) and fluorescence values were plotted against DNA (ng/well). FIG. 4A depicts the lower range of the DNA titration, whereas FIG. 4B includes the entire range.

Example 4

Figure 5A:
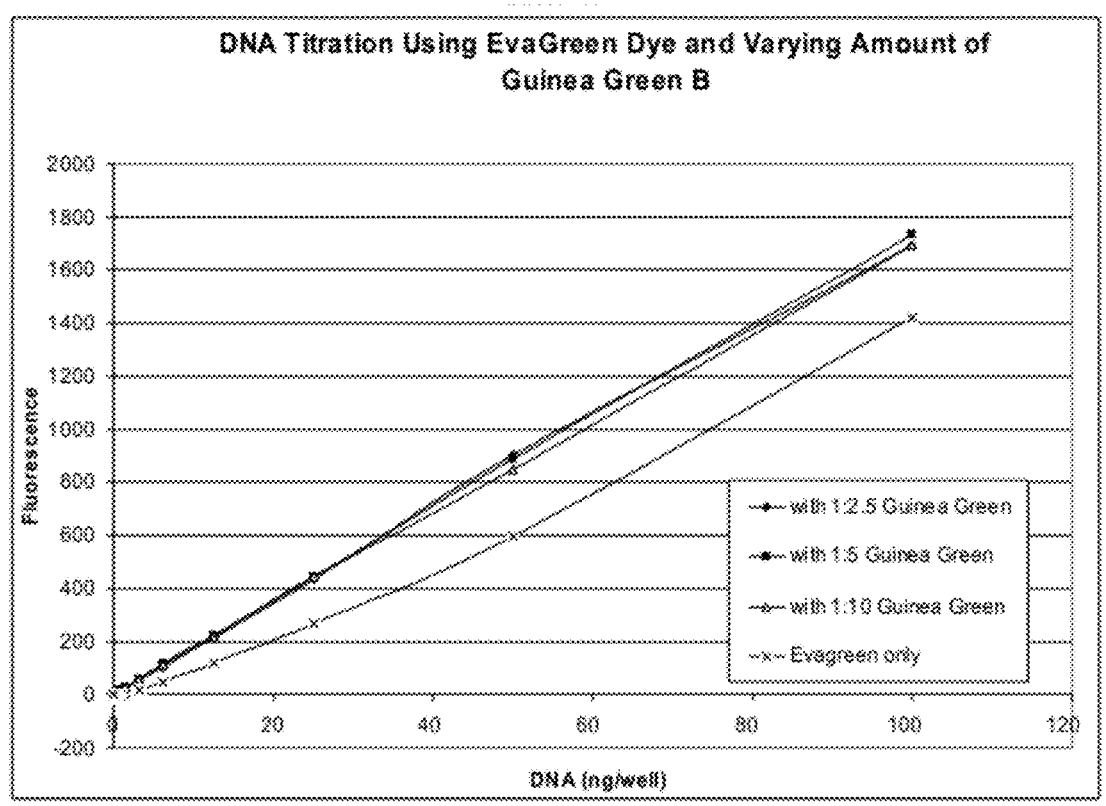
FIG. 5A shows a graph of change in fluorescence as a function of amount of DNA in a well using EvaGreen at 0.5× and varying amounts of Guinea Green B over a range of about 0 to about 100 ng/well.
Figure 5B:
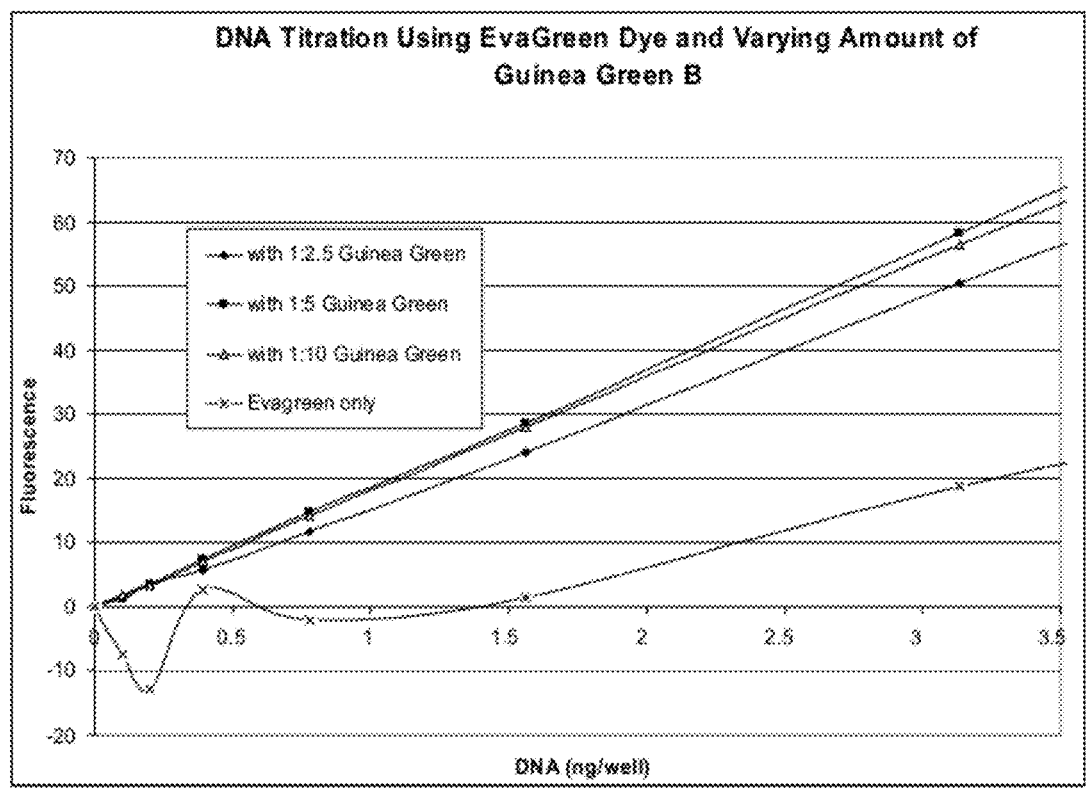
FIG. 5B shows a graph of change in fluorescence as a function of amount of DNA in a well using EvaGreen at 0.5× and varying amounts of Guinea Green B over a range of about 0 to about 3 ng/well.

Comparison of DNA Quantitation by EvaGreen with and without Guinea Green B as a Modulating Reagent The sensitivity and linearity of EvaGreen at 0.5× can be improved using Guinea Green B as a dye modifier, as evidenced by the graphs shown in FIG. 5A and FIG. 5B. FIG. 5A and FIG. 5B compare the sensitivity and linearity of DNA quantitation using EvaGreen and varying amounts of Guinea Green B as a modulating reagent. Guinea Green B was added at 1:2.5, 1:5 or 1:10 (modulating agent/dye) molar ratio to a solution of EvaGreen. Inset graph depicts the lower range of titration. The addition of Guinea Green B can also increase the sensitivity and linearity of DNA quantitation by EvaGreen alone. These data show that the use of different modulating agents can potentially increase the detection limit and linearity of the same dye.

The data shown in FIG. 5A and FIG. 5B were obtained using 0.5× EvaGreen with and without a 1:2.5, 1:5 or 1:10 molar ratio of Guinea Green B prepared in 1×TE buffer (10 mM Tris, 1 mM EDTA, pH 7.5). 10 µL of 2-fold dilutions of calf thymus dsDNA starting at 10 ng/µL (100 ng/well) were prepared in a total volume of 200 µL per well. Titrations were performed in black 96-well plates, incubated for 30 minutes at room temperature and read at 485 nm excitation and 530 nm emission using a Molecular Devices Gemini XS fluorescence plate reader. Triplicate samples were averaged and subtracted from background (no DNA) and fluorescence values were plotted against DNA (ng/well). FIG. 5B shows the lower range of titration, whereas FIG. 5A shows the entire range.

Example 5

Real-Time PCR Employing a DNA-Binding Dye and a Modulating Agent

The detection of amplification products in a real-time amplification reaction can be improved using a nucleic acid dye in conjunction with a modulating agent. The improvements can be as described herein, e.g., improvement in the linear detection range by at least about 0.05, 0.1, 0.2, 0.3, 0.4, 0.5, 0.6, 0.7, 0.8, 0.9, or 1 log.

A reaction can be performed as follows: real-time amplifications are performed on a iCycler IQ PCR instrument (Bio-Rad) in 20 µL reaction solution comprising 10 mM Tris (pH 8.0), 50 mM KCl, 3.5 mM $MgCl_2$, 2 mM each of dNTPs, 1 unit of AmpliTaq DNA polymerase (ABI, Foster City, Calif.), 1× (1.25 µM) EvaGreen dye (Biotium, Inc., Hayward, Calif.) and 6.25 µM Coomassie Blue R-250. An atpB fragment in pTOPO plasmid is amplified with 0.5 µM forward primer 5'-GAGGTCTTCACAGGTCATA-3' (SEQ ID NO: 1), 0.5 µM reverse primer 5'-CTCTTCAGCCAGCTTATC-3' (SEQ ID NO: 2). The thermal regimen is set at 95° C. for 1 minute followed by 50 cycles of 15-second duration at 95° C., of 15-second duration at 55° C., and of 15-second duration at 72° C. Fluorescence is measured at the 55° C. stage. In this instance, EvaGreen dye can be the DNA-binding dye and Coomassie Blue R-250 can be the modulating agent.

Example 6

Mutation Scanning by High Resolution Melt (HRM) Analysis Using a DNA-Binding Dye and a Modulating Agent The analysis of a target nucleic acid by high resolution melt analysis can be improved using a nucleic acid dye in conjunction with a modulating agent. The improvements can be as described herein, e.g., improvement in the linear detection range by at least about 0.05, 0.1, 0.2, 0.3, 0.4, 0.5, 0.6, 0.7, 0.8, 0.9, or 1 log.

A high resolution melt analysis can be performed as follows: The HTR2A single nucleotide polymorphism is studied. PCR amplification of a target nucleotide comprising the HTR2A SNP is performed on a RotorGene 6000 PCR instrument using KlenTaq1 polymerase (0.04 U/µL, AB Peptides, St. Louis, Mo.), 88 ng of TaqStart antibody (ClonTech, Palo Alto, Calif.), 50 mM Tris (pH 8.3), 1× (i.e., 1.25 µM)

EvaGreen dye and 6.5 μM Coomassie Blue V-250. A 331 by fragment of the hydroxytryptamine receptor 2A (HTR2A) gene includes the common polymorphism (T102C) within molar ratio of Coomassie Blue R250 to EtBr in water for 30 minutes. Images are taken on a GelDoc-It™ UV imaging system.

SEQUENCE LISTING

```
<160> NUMBER OF SEQ ID NOS: 2

<210> SEQ ID NO 1
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 1
gaggtcttca caggtcata                                                19

<210> SEQ ID NO 2
<211> LENGTH: 18
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 2
ctcttcagcc agcttatc                                                 18
``` exon 1 (Lipsky R H, et al., Clin Chem. 2001, 47:635-44). The reaction is cycled 40 times between 95° C. with no hold, 62° C. with 2 s hold, and 74° C. with a 20 s hold. After amplification, samples are heated momentarily to 94° C., cooled rapidly to 60° C., and PCR products melted at 0.2° C./s with continuous fluorescence acquisition. Derivative melting curves of different PCR products are co-plotted. The presence of any variant in the sequence can be detected using this method.

Example 7

Figure 6:
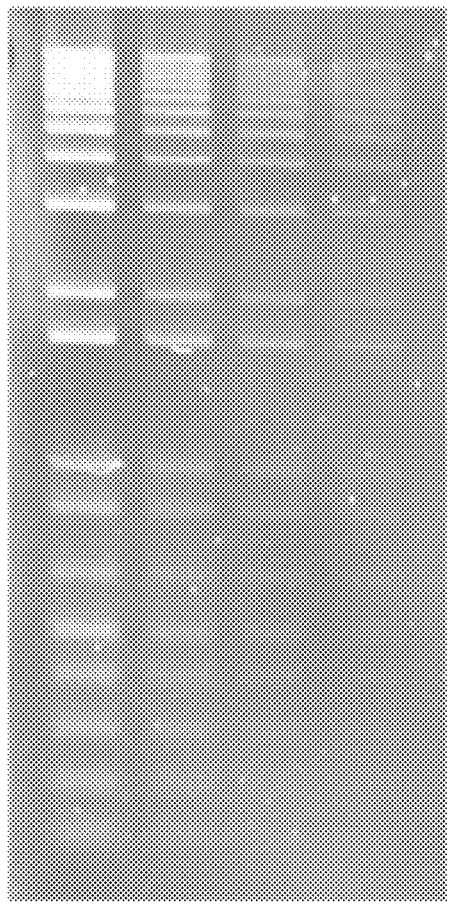
FIG. 6 shows pictures a first agarose gel stained with ethidium bromide and a second agarose gel that has been stained with ethidium bromide and Coomassie Blue.
Figure 6:
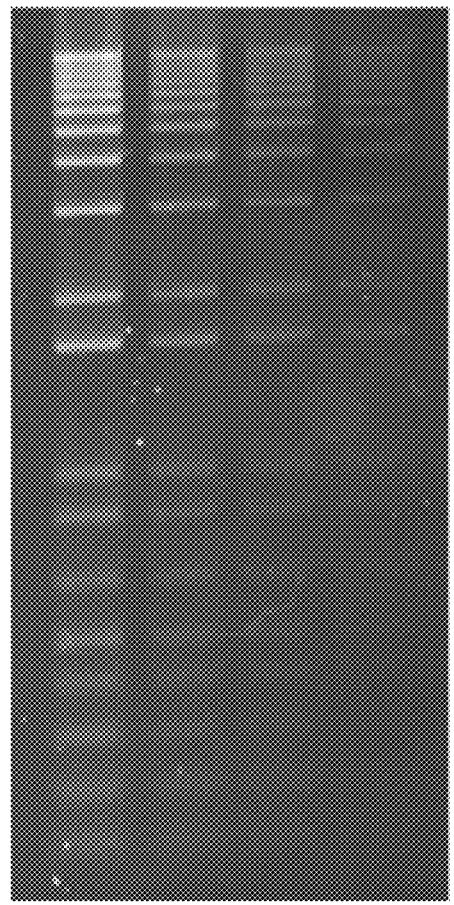

Comparison of DNA Fragment Intensity and Background Fluorescence in Agarose Gels Post-Stained with EtBr or EtBr with Coomassie Blue Analysis of stained gels can be improved using a nucleic acid dye and a dye modifier, as shown by FIG. 6. FIG. 6 shows a comparison of DNA fragment intensity and background fluorescence in agarose gels post-stained with ethidium bromide (EtBr) or EtBr with Coomassie Blue. The gel stained with EtBr has high fluorescence background while the gel stained with EtBr and Coomassie Blue shows reduced background intensity. The background intensity can be reduced relative to the signal corresponding to the 1 kb marker. The ratio of the 1 kb marker intensity to the background intensity can be increased by about or greater than about 10, 20, 50, 75, 100, 150, 250, or 400%. These findings demonstrate that the addition of a modulating reagent can reduce high fluorescence background of gels stained with agents such as EtBr.

The gel analysis shown in FIG. 6 can be performed as follows: 2-fold dilutions of a 1 kb Plus Ladder (Invitrogen) at 200 ng, 100 ng, 50 ng and 25 ng were loaded in separate lanes of a gel, from left to right as shown in FIG. 6, respectively. The gel is a 1% agarose gel in 1×TBE. After electrophoresis, gels were stained in a solution of 3 ug/mL EtBr or EtBr with a 5

What is claimed is:

1. A reagent composition comprising:
   (a) a light-emitting dye capable of binding to nucleic acid, wherein the light-emitting dye is substantially non-fluorescent when uncomplexed with said nucleic acid in the absence of a light-emitting dye modifier; and
   (b) a light-emitting dye modifier comprises at least two sulfonate groups that is not covalently bonded to the light-emitting dye;
   wherein the reagent composition permits detection of nucleic acid present in a concentration that is lower than minimum concentration detectable using identical detection means and another reagent composition, said another reagent composition having the light-emitting dye present in the same concentration but lacking said modifier.

2. The reagent composition of claim 1, wherein the dye is a fluorescent dye.

3. The reagent composition of claim 1, wherein the dye is an intercalating dye.

4. The reagent composition of claim 1, wherein the light-emitting dye is a minor groove binding dye.

5. The reagent composition of claim 1, wherein the reagent composition does not substantially inhibit a nucleic acid amplification reaction.

6. The reagent composition of claim 1, wherein the dye is capable of binding to DNA, RNA, or a hybrid thereof.

7. The reagent composition of claim 6, wherein the dye is capable of binding to double-stranded DNA.

8. The reagent composition of claim 1, wherein mixing the reagent composition of claim 1 with a sample comprising nucleic acids under condition to yield dye-nucleic acid complexes yields a change in detectable optical signal which is greater than that detected under the same conditions in the absence of said modifier.

9. The reagent composition of claim 1, wherein the light-emitting dye modifier is selected from the group consisting of Coomassie Brilliant Blue R-250, Coomassie Brilliant Blue V-250, Coomassie Brilliant Blue G-250 and Guinea Green B.

10. The reagent composition of claim 1, wherein the light-emitting dye is selected from the group consisting of EvaGreen dye, a Hoechst dye, SYBR Green I, BEBO, BOXTO, SYTO9, LC Green Plus, ResoLight and Chromofy.

11. The reagent composition of claim 1, wherein the light-emitting dye modifier is not a fluorescent dye.

12. The reagent composition of claim 1, wherein the light-emitting dye modifier is not complexed to a metal.

13. The reagent composition of claim 1, wherein the light-emitting dye modifier is a fluorescent dye and comprises an absorption maximum wavelength of at least about 10 nm longer or shorter than a fluorescence maximum wavelength of the light-emitting dye.

14. A kit comprising a reagent composition of claim 1 and instructions describing how to use said reagent composition.

\* \* \* \* \*